United States Patent [19]

Strasser

[11] Patent Number: 5,025,667

[45] Date of Patent: Jun. 25, 1991

[54] HERMETIC PRESSURE SENSOR

[75] Inventor: Werner Strasser, Versailles, Ky.

[73] Assignee: Texas Instruments Incorporated, Dallas, Tex.

[21] Appl. No.: 366,793

[22] Filed: Jun. 15, 1989

[51] Int. Cl.[5] .............................. G01L 7/08; G01L 9/12
[52] U.S. Cl. ........................................ 73/724; 73/718; 92/103 M; 200/83 P; 361/283
[58] Field of Search .................................. 73/715–728, 73/706; 92/103 M; 361/283; 29/454, 421.1, 622, 404; 200/83 P

[56] References Cited

U.S. PATENT DOCUMENTS

| | | | |
|---|---|---|---|
| 1,143,338 | 6/1915 | Wesener | 73/715 |
| 1,611,659 | 12/1926 | Malivert | 73/715 |
| 1,960,466 | 5/1934 | Thrall | 73/715 |
| 3,302,269 | 2/1967 | Cooper et al. | 29/155.5 |
| 3,585,328 | 6/1971 | Fiore | 92/103 M |
| 4,145,588 | 3/1979 | Orcutt | 200/83 P |
| 4,488,343 | 12/1984 | Scott et al. | 92/103 M |

Primary Examiner—Donald O. Woodiel
Attorney, Agent, or Firm—John A. Haug; James P. McAndrews; Melvin Sharp

[57] ABSTRACT

A pressure sensing element having a housing including a flexible membrane receiving portion, a flexible disc member of predetermined shape secured within the housing, and a flexible membrane disposed within the housing, the flexible membrane being substantially more flexible than the disc member, the membrane having an outer portion hermetically secured to the membrane receiving portion, a central portion impinging against the disc member and conforming to the shape thereof and an intermediate unsupported portion joining the interior portion of the outer portion and the exterior portion of the central portion. The hermetically sealed diaphragm is obtained by providing a diaphragm capable of deforming to a fixed shape, hermetically securing the edge portion of the diaphragm to a securing member, and then forcing a central portion of the diaphragm under sufficient pressure against a surface of predetermined shape and more rigid than the diaphragm to cause the central portion of the diaphragm to conform to the shape of the surface and provide an unwrinkled planar central diaphragm.

9 Claims, 2 Drawing Sheets

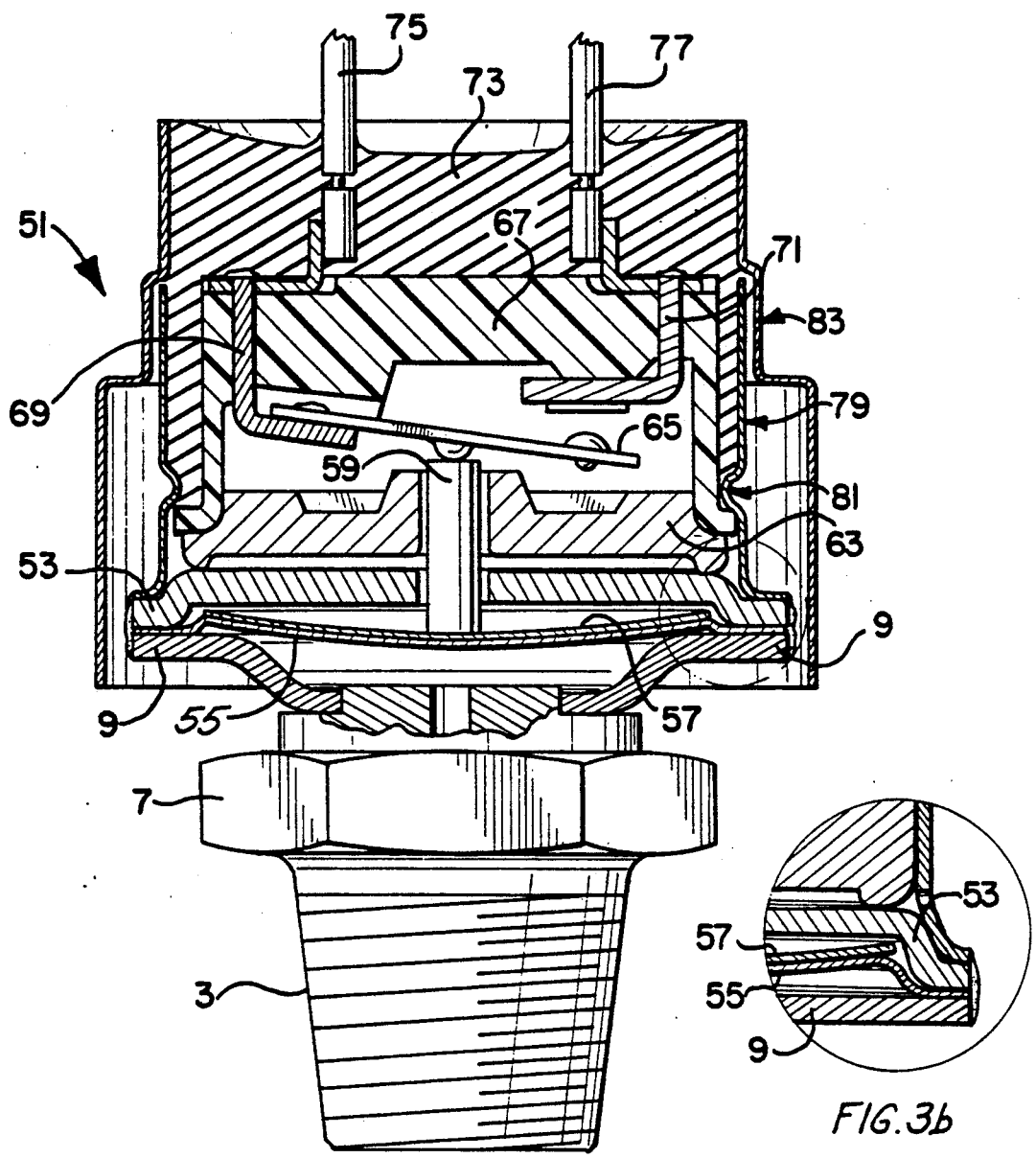
FIG. 3
FIG. 3b
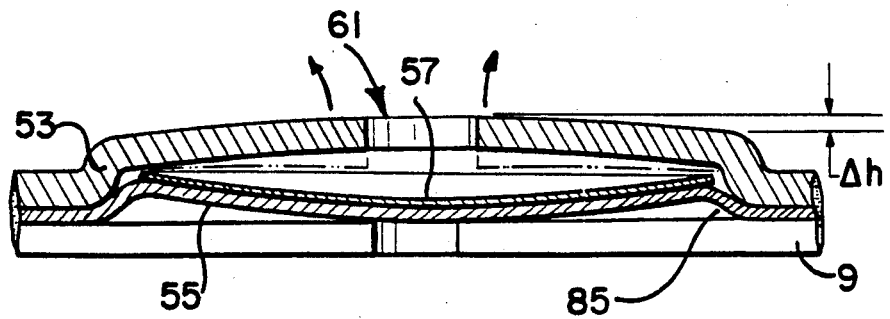
FIG. 3a

HERMETIC PRESSURE SENSOR

BACKGROUND OF THE INVENTION

1. Field of the Invention

This invention relates to an hermetic pressure sensor and, more specifically, to an hermetic pressure sensor for gauge and absolute pressure sensing elements for use in environments requiring hermeticity, such as refrigeration systems, chemically hostile, expensive or poisonous pressure medias, fluids or other such environments.

2. Brief Description of the Prior Art

Sensing of pressures in environments requiring hermeticity, such as refrigeration systems, chemically hostile, expensive or poisonous pressure medias, fluids or other such environments generally requires the use of pressure sensors having walls which are impermeable to such environments and which are chemically stable, corrosion resistant and insensitive to temperature fluctuations. Such pressure sensors must hermetically seal or isolate the pressure sensing element from the pressure providing medium and prevent leakage or seepage of the pressure providing medium into the environment.

One type of sensor utilized for such pressure sensing is based upon the mechanical principle of the elastic property of materials (spring rate) wherein at least one wall of the sensor is designed and manufactured to produce predictable elastic deformation or deflection under pressure. This deflection is used to either produce electrical analog signals in the case of transducers or to mechanically open and close a set of contacts in the case of pressure switches. To accurately assess the pressures being measured, this elastic wall must be in direct contact with the pressure providing medium and must be joined to other walls of the pressure providing medium containment device in a manner which prevents or minimizes mechanical coupling of stray forces and stray deflections from such other walls into the elastic wall used for pressure measurement.

Conventionally, the elastic wall in such pressure sensors is formed utilizing a diaphragm which provides a type of hermeticity and is produced by using flexible man-made materials, such as rubber sheet, Kapton, silicone rubber, silicone gels and the like. The application of such prior art pressure sensors often requires that hermeticity of the pressure applying system be maintained for extended periods. Low cost sensors, in general, do not meet this requirement because the pressure seals are made from organic compounds as noted above. These compounds may degrade over a long time period, and/or may degrade from repeated movement thereof and/or may not be suitable for use in conjunction with certain chemical pressure fluids and/or may not be useful over the desired or required range of temperatures.

Other approaches, such as provided in the Klixon 20PS pressure switch sold by Texas Instruments Incorporated, obtain their hermeticity through welding or brazing of single or multiple flexible membranes (pressure discs) to a flanged, rigid pressure fitting at the outer perimeter of the disc. Undesired interaction between the welding process (weld solidification stress) material composition and the precalibrated membrane results in low precision sensors which exhibit sensitivity to temperature and early fatigue of the weld joint.

Bellows type sensors use corrugated (highly flexible) tubes or membranes which are pre-loaded or supported by force-carrying members to limit deflection. The bellows is brazed or welded to a flanged pressure port. Corrugation provides lowest resistance to deflection and a relatively linear (not snap acting) deflection to force ratio (spring rate) which is designed to compromise between measuring accuracy and maximum permissible pressure at the pressure port. For high system pressures, the membranes must be of such thickness as not to cause permanent deformation of the bellows membrane. The bellows primarily fulfills the function of sealing the fluid medium and also has to withstand and carry a high portion of the forces exerted by the fluid pressure.

It is therefore apparent that a hermetic sealing member is required which can be used in environments of the type described hereinabove, which provide the required properties noted hereinabove and which can also be produced relatively economically.

SUMMARY OF THE INVENTION

The low cost hermetic seal in accordance with the present invention utilizes high temperature and chemically stable materials, including, but not limited to inconel, copper alloys, aluminum and preferably stainless steel and is joined to the pressure containment element by means of metal to metal welds, such as, but not limited to, gas tungsten arc welding (TIG) and resistance, E-beam or laser welding. The joint so produced is designed to provide hermetic sealing as well as have a high load carrying capability. Since the metal joints are purposely formed of materials having similar coefficients of thermal expansion, the risks of leakage due to thermal gradients are minimal. Also, since the joint does not participate in reaction forces generated by the pressure medium, such joint need be only the width of the membrane thickness due to the support thereof by the disc support.

For convenience of welding, an hermetic sealing material is chosen which can be readily joined using currently available technologies. Since it is known that flexual resistance of the membrane material impacts measuring accuracy of the sensor, physical parameters are selected to obtain the lowest flexual resistance (spring rate). Spring rate is a direct function of length (diameter) and a function of material thickness according to a higher power. The hermetic sealing material thickness is selected to be as low as possible subject to conformance to the required availability and convenience of processing of the material utilized. A material thickness of 2 mils for stainless steel is preferred and imposes a measuring offset of less than −1.5 psi. However other materials can be used which can provide hermetic seals and are brazable or weldable and are about 40 per cent ductile, though the ductility is not critical. Examples of other materials that can be used are plain steel and copper alloys. To provide intimate contact with pressure sensing elements, the material should have large elongation value or ductility and low proportional limit. Annealed stainless steel provides these desired properties and is a preferred hermetic sealing material in accordance with the present invention. The low proportional limit allows flowing of the membrane at relatively low system pressure (about 150 to 200 psi) without membrane fracturing and guarantees that the membrane contacts the force supporting structure and the sensor element. In addition, radial forces generated during membrane movement (deflection) for measuring purposes and radial forces generated by the force supporting walls (temperature and pressure) will be minimal because they will cause permanent deformation (elongation) of the membrane.

To further minimize radial force changes, it is of importance that the diaphragm seal flange portion be located in a plane offset from the measuring surface of the diaphragm. This translates stray forces into torques which are absorbed in an area which is not used for measurement (stationary) between the flange portion and the measuring surface of the diaphragm. This area is one of single convolution, being a linear distance and a radius, is away from the hermetic joint, minimizes fracture of the joint and fracture of the membrane and minimizes transmission of stray forces into the sensing element.

Producing and processing membranes of metal which are thinner than paper and forming convolutions, though initially appearing to be costly, requires substantially no skill in accordance with the procedures of the present invention. The hermetic seal is formed first using relatively flat metallic, preferably annealed stainless steel membranes. The forming or seating of the membrane is accomplished after all other parts of the structure are joined and the outer flange portion of the membrane has been welded thereto. The membrane will be highly wrinkled in the central measuring surface portion thereof at this point and not suitable for accurate measurement of movement in response to pressure thereon. It is therefore necessary to provide a flattened or curved central section or measuring surface of the diaphragm which is unwrinkled and offset from the plane of the flange portion of the diaphragm. This is accomplished by displacing the seated membrane beyond the elastic limit of the membrane under sufficiently high pressure against a flat or concave surface in its normal at rest position, depending upon the desired final shape of the diaphragm measuring surface, this surface being offset from the plane of the seat or flange portion of the membrane to reform the membrane against said surface to the shape of said surface and remove the wrinkles therefrom. The central portion of the diaphragm which abuts the flat surface will take the shape of the surface, but be offset from the plane of the diaphragm seat or flange by a distance equal to the offset of the surface therefrom.

Measurement takes place in a standard manner by placing a diaphragm movement responsive device, such as a transducer or a switch, on the surface of the pressure sensing central portion of the diaphragm and remote from the pressure receiving surface of the diaphragm.

As an alternative embodiment, an initial pressure bias can be placed against the diaphragm from the pressure receiving side thereof to permit measurement of pressures less than ambient, such as a partial vacuum. In this way, a positive pressure against the diaphragm can be sensed even when the pressure applied is a partial vacuum.

BRIEF DESCRIPTION OF THE DRAWINGS

FIGS. 3, 3a and 3b, FIG. 3b being a blown up portion of FIG. 3, show a typical free disc pressure switch using a bimetal or monometal calibration spring disc having a disc support in conjunction with the pressure sensing element of FIG. 1.

DESCRIPTION THE PREFERRED EMBODIMENT

Figure 1:
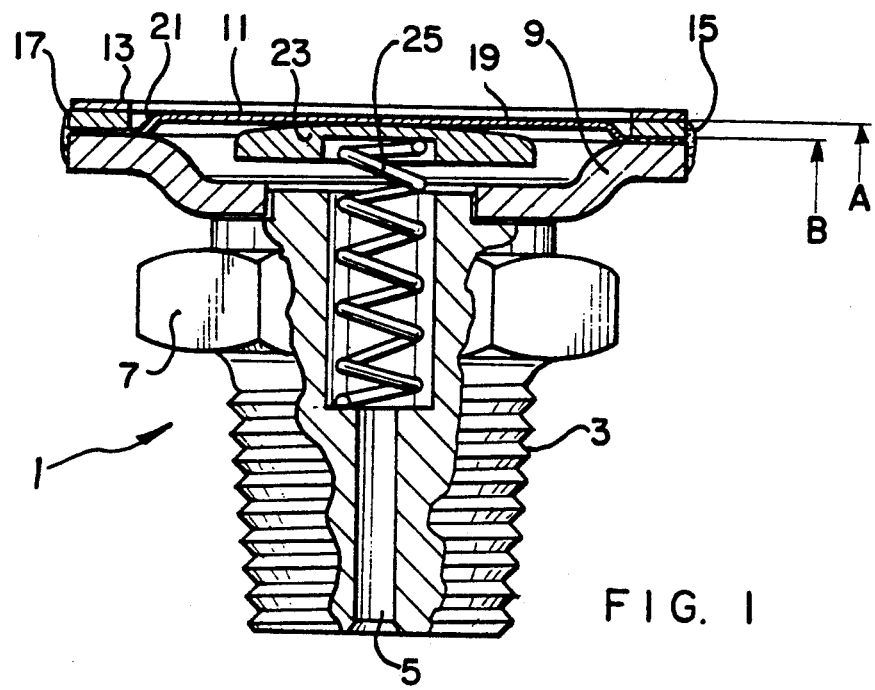
FIG. 1 shows a pressure sensing element having an hermetic seal in accordance with the present invention including a spring with force disc for vacuum sensors or sensors which have other than atmospheric reference pressures.

Referring first to FIG. 1, there is shown a pressure sensing element in accordance with the present invention. The element 1 includes a pressure fitting 3 which is shown as a tapered threaded member, it being understood that other known threaded or unthreaded such arrangements can be substituted therefor. A pressure port 5 extends through the central portion of the pressure fitting 3. The rear portion of the pressure fitting 3 includes a polygonal shaped nut portion 7 for receiving a wrench or the like for securing the pressure fitting in an appropriate receptacle therefor. A flange 9, preferably of stainless steel, is provided as a portion of the pressure fitting 3 or, alternatively, as a separate member secured to the pressure fitting such as by brazing, resistance welding or the like.

A membrane 11, preferably of stainless steel, is seated between the flange 9 and a disc support 13. An hermetic seal is formed among the flange 9, membrane 11 and disc support 13 by a weldment 15 which can be provided in any well known manner, such as, for example, TIG or resistance, E-beam or laser welding. It will be noted that the membrane 11, which is preferably 2 mils in thickness, has a flat flange portion 17 positioned between flange 9 and disc support 13, flat pressure sensing portion 19 offset from the plane of the flange portion and a convolution portion 21 in form of an arc bridging the flange portion and the flat pressure sensing portion. The manner of forming the membrane 11 to the desired shape is discussed hereinabove.

As a second embodiment, referring again to FIG. 1, there is further shown a force disc 23 and a bias spring 25, neither of which form a part of the first embodiment discussed hereinabove. As can be seen, the bias spring 25 is seated in a chamber in the fitting 3 and, at one end thereof, surrounds the pressure port 5 and at its other end is seated in a recess in the force disc 23. The force disc 23 is biased against the diaphragm 11 under the bias force of the spring 25 to provide an initial normal pressure against the diaphragm or membrane 11. In this manner, the pressure sensing element 1 can measure partial vacuums applied at pressure port 5 since a reduced but positive pressure will still be applied to the membrane 11 under such partial vacuum conditions.

Figure 2:
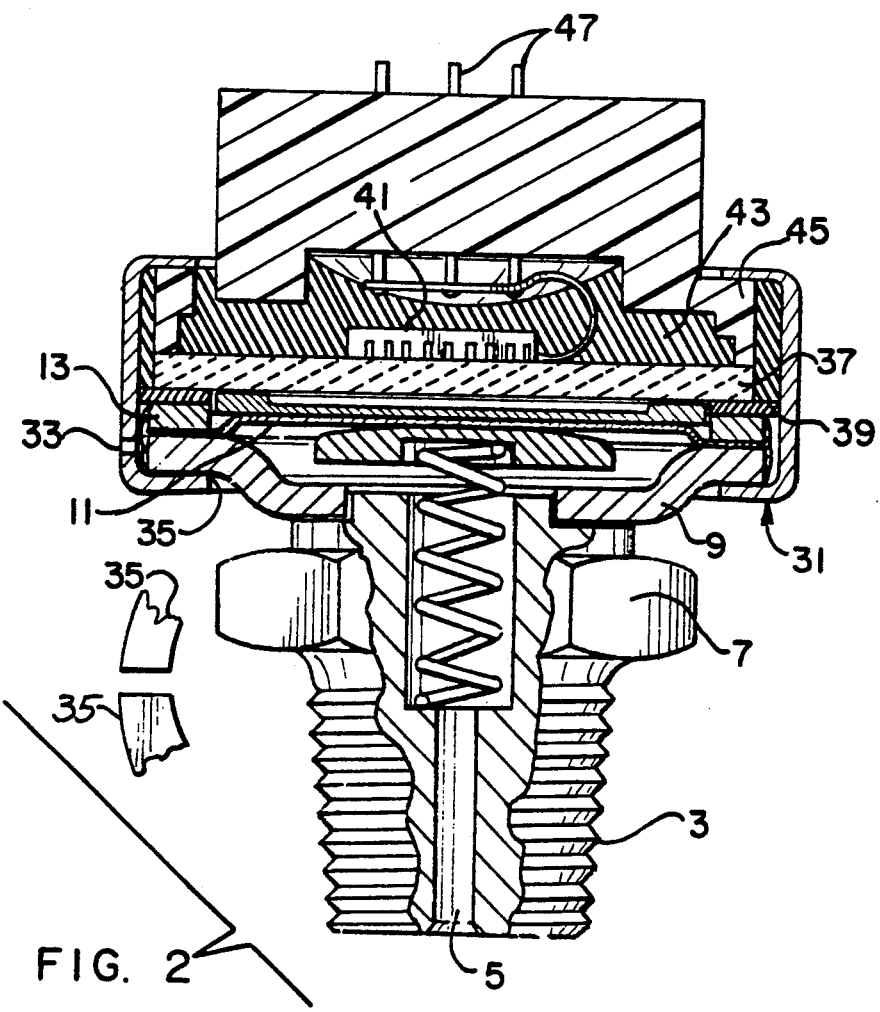
FIG. 2 shows a typical transducer arrangement in conjunction with the pressure sensing element of FIG. 1.

Referring now to FIG. 2, there is shown a typical transducer arrangement in conjunction with the pressure sensing element of FIG. 1. All elements in FIG. 2 with the same character references as in FIG. 1 represent the same or similar structure. As can be seen, a steel shell 31 having a reference pressure port 33 is secured over the flange 9 with a gasket 35 therebetween. Secured over and spaced from the disc support 13 by a gasket 39 is a ceramic capacitor pressure sensing element 37 of well known type which requires no further explanation herein. A standard electronic circuit 41 for measuring the pressure sensed as a result of the capacitance of the capacitor 37 is positioned over the capacitor and is secured thereat by epoxy 43 which provides an environmental seal of the electronics and structural strength. The shell 31 is secured over a flange in a thermoplastic housing 45 secured in the epoxy 43. Electrical connections 47 which extend from the electronic circuit 41, through the epoxy 43 and the housing provide terminals for connection to external devices.

Referring now to FIGS. 3, 3a, and 3b, there is shown a typical switch arrangement 51 in conjunction with the pressure sensing element of FIG. 1. All elements in FIGS. 3, 3a and 3b with the same character references as in FIG. 1 represent the same or similar structure. In this embodiment, the pressure sensing structure of FIGS. 1 and 2 is replaced by a membrane or diaphragm 55 welded to flange 9 and disc support 53. The diaphragm 55 is in the shape of a sector of a sphere and is supported in its central region by mono or bimetal disc 57. The disc 57 is initially in the shape of a sector of a sphere and causes the diaphragm to assume that same shape in its central region thereon in the same manner as the embodiments of FIGS. 1 and 2 assume a flat, unwrinkled shape as will be discussed hereinbelow. The diaphragm 55 includes, on the low pressure side thereof, a mono or bi-metallic disc 57 secured between the diaphragm and the disc support 53. The disc support 53 has an aperture portion 61 which guides a pin 59 which is seated on the disc 57 and extends through the aperture in the disc support 53 and guide 63 to contact a normally open switch arm 65 which is a portion of a switch assembly 67. The pin 59 provides a dimensional reference point for the location of electrical switch arm 65.

Switch arm 65 is secured to a first terminal 69 which is also a part of a switch assembly 67. A second terminal 71 which is normally spaced from the switch arm 65 also forms a part of the switch assembly 67. An epoxy cast seal 73 encases the switch assembly 67 with electrical terminals 75 and 77 passing therethrough for external connection. A stainless steel retainer 79 is positioned over the epoxy cast and is secured to the switch assembly 51 by a roll-in or crimp 81 thereagainst. A shield 83 which is formed of metal or elastomer to retain the epoxy cast 73 and shield the device from the environment is positioned over the entire structure and is retained to the switch assembly by press fitting.

The switch operates in standard manner wherein, upon the application of some predetermined minimum pressure to the diaphragm 55, the disc 57 will snap into its alternate position engaging the bottom surface of support 53 and force the pin 59 upward through the aperture 61. This will cause the switch arm 65 to move against the terminal 71 to complete the circuit and provide an indication that the predetermined pressure has been sensed.

It should be noted that the distance between the plane of the diaphragm seat and a plane parallel thereto passing through the center of the diaphragm is adjustable. To produce a precise release pressure set point, the center of the support 53 for the diaphragm is adjusted after the assembly is completed. This is performed with fluid pressures which are at least three times higher than the maximum system pressure specified for the application (500 to 3,500 psi). As seen in FIG. 3a a differential height Δh is obtained by bending the central portion of disc support 53 in the direction of the arrows from the dashed line position to the solid line position by means of the pressure.

In order to cause the diaphragm to be wrinkle free and assume the shape of the disc, the diaphragm 55 is initially welded to the flange 9 and disc with disc 57 therebetween as shown, for example, in FIG. 3a. It should be understood that, though the disc 57 is shown as a sector of a spherical surface with its center on one side of the membrane, the disc can take any shape, such as, for example, flat as in FIGS. 1 and 2, and the diaphragm 55 will conform thereto as will be described.

With the diaphragm 55 secured and the disc in place as described above, a very high pressure on the order of 500 to 3,500 psi is provided at the pressure port 5. This high pressure, which is generally higher than the pressures which would normally be encountered by the device, will impinge against the diaphragm 55 and force the diaphragm against the disc 57, causing the portion of the diaphragm contacting the disc to conform to the shape of the disc. This procedure is performed only once, prior to use of the device in practice. It can be seen that the shape of the portion of the diaphragm 55 which contacted the disc 57 will be, after the above described application of high pressure, that of a sector of a sphere in the embodiment of FIGS. 3 and 3a and a flat member in the embodiments of FIGS. 1 and 2. The diaphragm will then retain this new shape. It can also be seen that, after application of the high pressure, the diaphragm includes a flat planar outer flange portion welded to the flange 9 and disc support 53, a radial portion 85 of FIG. 3a and 21 of FIG. 1 and an interior portion which conforms to the shape of the disc 57. The edges of the interior portion of the diaphragm which joint the radial portion 85 will be offset from the plane of the flange portion of the diaphragm where it joins the radial portion 85 whereby movements of the diaphragm due to changes of pressure thereagainst will cause flexure only along the radial portion 85.

Though the invention has been described with respect to a specific preferred embodiment thereof, many variations and modifications will immediately become apparent to those skilled in the art. It is therefore the intention that the appended claims be interpreted as broadly as possible in view of the prior art to include all such variations and modifications.

What is claimed is:

1. Pressure sensing apparatus comprising a metal housing having a cavity formed therein, the housing having a pressure port in communication with the cavity with an annular, radially extending flange circumscribing the cavity, a thin, flexible, metal membrane having an annular outer periphery disposed on the flange, the membrane having a central measuring section which is generally flat in its normal at rest position and in its normal at rest position having a single convolution between the annular outer periphery and the central measuring section so that the central measuring section lies in a plane offset from a plane in which the annular outer periphery lies, a metal member having a ring shaped portion received over the annular outer periphery of the membrane, the annular flange, the annular outer periphery of the membrane and the ring shaped portion being welded together to form an hermetic seal.

2. A pressure sensing apparatus as set forth in claim 1 wherein said flexible membrane is formed of stainless steel.

3. A pressure sensing element as set forth in claim 1, further including an inlet port in said housing extending to one surface of said flexible membrane and means responsive to movement of said flexible membrane and abutting the opposing surface of said flexible membrane to provide an indication of said movement.

4. A pressure sensing element as set forth in claim 1, further including means positioned within said housing to apply a normal bias to said flexible member.

5. Pressure sensing apparatus comprising a metal housing having a cavity formed therein, the housing having a pressure port in communication with the cavity with an annular, radially extending flange circumscribing the cavity, a thin, flexible, metal membrane having an annular outer periphery disposed on the flange, the membrane having a central measuring section which has a smooth curved surface formed of one or more radii having centers on only one side of the membrane in its normal at rest position and having an intermediate section consisting of a single convolution between the annular outer periphery and the central measuring section, the periphery of the membrane lying within a predetermined first plane, the outer portions of the central measuring section in its normal at rest position lying in a second plane offset from the first plane, a metal member having a ring shaped portion received over the annular flange, the annular flange, the annular outer periphery of the membrane and the ring shaped portion being welded together to form an hermetic seal.

6. A pressure sensing apparatus as set forth in claim 5 wherein said flexible membrane is formed of stainless steel.

7. A pressure sensing apparatus as set forth in claim 5 in which the metal member having a ring shaped portion includes a wall portion extending inwardly from the ring shaped portion and a metallic dish shaped disc is disposed between the wall portion and the membrane, the position of the wall being deformable to adjust the release set point of the disc.

8. A pressure sensing element as set forth in claim 5, further including an inlet port in said housing extending to one surface of said flexible membrane and means responsive to movement of said flexible membrane and abutting the opposing surface of said flexible membrane to provide an indication of said movement.

9. A pressure sensing element as set forth in claim 5, further including means positioned within said housing to apply a normal bias to said flexible member.

* * * * *